US007076866B2

(12) United States Patent
Iannucci

(10) Patent No.: US 7,076,866 B2
(45) Date of Patent: Jul. 18, 2006

(54) SIMULTANEOUS RIVETING SYSTEM OF FLAT SURFACES FOR RIVETERS

(76) Inventor: Marco Iannucci, Viale della Ponte Santa, 5, Ortona (IT) I-66026

( * ) Notice: Subject to any disclaimer, the term of this patent is extended or adjusted under 35 U.S.C. 154(b) by 128 days.

(21) Appl. No.: 10/500,099

(22) PCT Filed: Dec. 18, 2002

(86) PCT No.: PCT/EP02/14513

§ 371 (c)(1),
(2), (4) Date: Jun. 24, 2004

(87) PCT Pub. No.: WO03/055655

PCT Pub. Date: Jul. 10, 2003

(65) Prior Publication Data

US 2005/0040203 A1 Feb. 24, 2005

(30) Foreign Application Priority Data

Jan. 4, 2002 (IT) .......................... MI2002A0004

(51) Int. Cl.

*B23Q 7/10* (2006.01)
*B21J 15/10* (2006.01)
*B21J 15/02* (2006.01)

(52) U.S. Cl. ..................... 29/809; 29/34 B; 29/243.53; 227/51; 227/56; 227/114; 227/135; 227/153; 72/466.4

(58) Field of Classification Search .................. 227/56, 227/53, 51, 114, 135, 153; 29/798, 809, 29/34 B, 243.5, 243.517, 243.53, 525.01, 29/525.06; 72/466.4
See application file for complete search history.

(56) References Cited

U.S. PATENT DOCUMENTS 3,010,597 A * 11/1961 Beasley et al. ............... 227/56
3,095,999 A * 7/1963 Peterson ..................... 221/233
3,534,896 A * 10/1970 Krynytzky et al. ........... 227/51
3,543,985 A * 12/1970 Adolphi ......................... 227/7
3,747,193 A * 7/1973 Gregory .................. 29/243.53
4,026,454 A 5/1977 Coe et al.
5,123,158 A * 6/1992 Dixon ......................... 29/714

(Continued)

FOREIGN PATENT DOCUMENTS

EP 33245 A1 * 8/1981

(Continued)

*Primary Examiner*—Essama Omgba
(74) *Attorney, Agent, or Firm*—Thomas S. Baker, Jr.

(57) ABSTRACT

A riveting system for hammering a set of nails along a path having a rotatable upper table with a plurality of riveting mechanisms positioned along a plurality of radii on the upper table and a lower table having a plurality of upset members positioned along a plurality of radii on the lower table.

24 Claims, 7 Drawing Sheets

U.S. PATENT DOCUMENTS

| | | | | | |
|---|---|---|---|---|---|
| 5,414,921 | A | * | 5/1995 | Waldebjer | 29/524.1 |
| 5,427,297 | A | * | 6/1995 | Tymianski | 227/109 |
| 5,524,808 | A | * | 6/1996 | Vogrig | 227/147 |
| 6,011,482 | A | * | 1/2000 | Banks et al. | 340/686.1 |
| 6,053,308 | A | * | 4/2000 | Vogrig et al. | 198/844.2 |
| 6,073,326 | A | * | 6/2000 | Banks et al. | 29/34 B |
| 6,088,897 | A | * | 7/2000 | Banks et al. | 29/243.53 |
| 6,121,781 | A | * | 9/2000 | Martinez | 324/658 |
| 6,134,940 | A | * | 10/2000 | Banks et al. | 72/476 |
| 6,158,666 | A | * | 12/2000 | Banks et al. | 238/10 R |
| 6,189,418 | B1 | * | 2/2001 | Sloan et al. | 81/57.36 |
| 6,210,084 | B1 | * | 4/2001 | Banks et al. | 408/97 |
| 6,266,871 | B1 | * | 7/2001 | Edwards | 29/818 |
| 2005/0235475 | A1 | * | 10/2005 | Meyers | 29/432 |
| 2005/0251981 | A1 | * | 11/2005 | Mossbeck et al. | 29/91.1 |

FOREIGN PATENT DOCUMENTS

| | | | | |
|---|---|---|---|---|
| EP | 571336 | A1 | * | 11/1993 |
| SU | 1094668 | A | * | 5/1984 |

* cited by examiner

SIMULTANEOUS RIVETING SYSTEM OF FLAT SURFACES FOR RIVETERS

The present invention is about an original and inventive simultaneous riveting system which allows to apply at the same time sets of nails on the flat surfaces of elements to be riveted, following any riveting outline, with speed and precision that are hardly achievable with the riveters of the present state of the art.

The riveting of surfaces along non-rectilinear outlines, like for example paths along continuous closed lines, such as circumferences along which nails' rounds must be applied to, is a long and complex operation because the existing riveters have riveting and upsetting mechanisms that can carry out only rectilinear paths, therefore in order to accomplish for example circular nails' rounds, like when reels' flanges have to be riveted for the winding and transport of cables, ropes or similar elements of remarkable linear development, the flange must be stepwise rotated of 180 degrees in order to finish the application of the nails on the entire given circular path.

The present invention's object is thus that of creating a system which allows to carry out the simultaneous riveting on every type of varied or perimetrical path of any suitable surface and also at the same time with any desired number of nails with a maximum rotation of the surface to be riveted equal to a small circle's arc or even without any rotation when all the provided nails are going to be hammered in simultaneously with a single blow.

The present invention brilliantly solves this problem by providing a system of riveting and upsetting mechanisms' star arrangement, placed along a certain number of radiuses, so that the mechanisms' unit of each radius will have to hammer in only those nails which must be applied into the circular sector of the surface to be riveted, delimited by two successive radiuses.

It is thus clear that the radiuses are provided as many as the rows of radial nails to be applied, the entire riveting could be carried out with a single blow, or if the nails' rows to be applied are greater than the number of radiuses whereon the mechanisms are placed, the surface to be riveted from each mechanisms' radius will be equal to the circular sector comprised between two successive radiuses and therefore rotating the mechanisms to the respective circle's arc will be enough to accomplish such operation.

In the vast majority of cases of practical use, and more specifically for the riveting of reels' flanges, where various nails' concentric circles must be applied to, the mechanisms' arrangement on twelve radiuses has turned out to be optimal, hence for the completion of the riveting a 30 degrees rotation of said mechanisms is sufficient.

A corresponding number of nails' selecting devices is provided for the nails' feeding to the riveting mechanisms, which pick up from the nails' magazines a nail at a time and send it to their lower riveting mechanism, each one of them being essentially made of a nail collet and of a hydraulic hammer for the pressure driving of the nail.

The riveting mechanisms are fixed to an upper revolving table and the respective upsetting mechanisms to a lower revolving table in synchronism with the upper one, for a maximum circle's arc corresponding to the circular sector where each unit must act on.

A preferred embodiment of the riveting system according to the present invention will be here shown in details, in an explanatory but not limiting way of the invention's scope, referring to a riveter for cable reel's flanges, described with reference to the illustrative drawings' annexed sheets, wherein.

Figure 1:
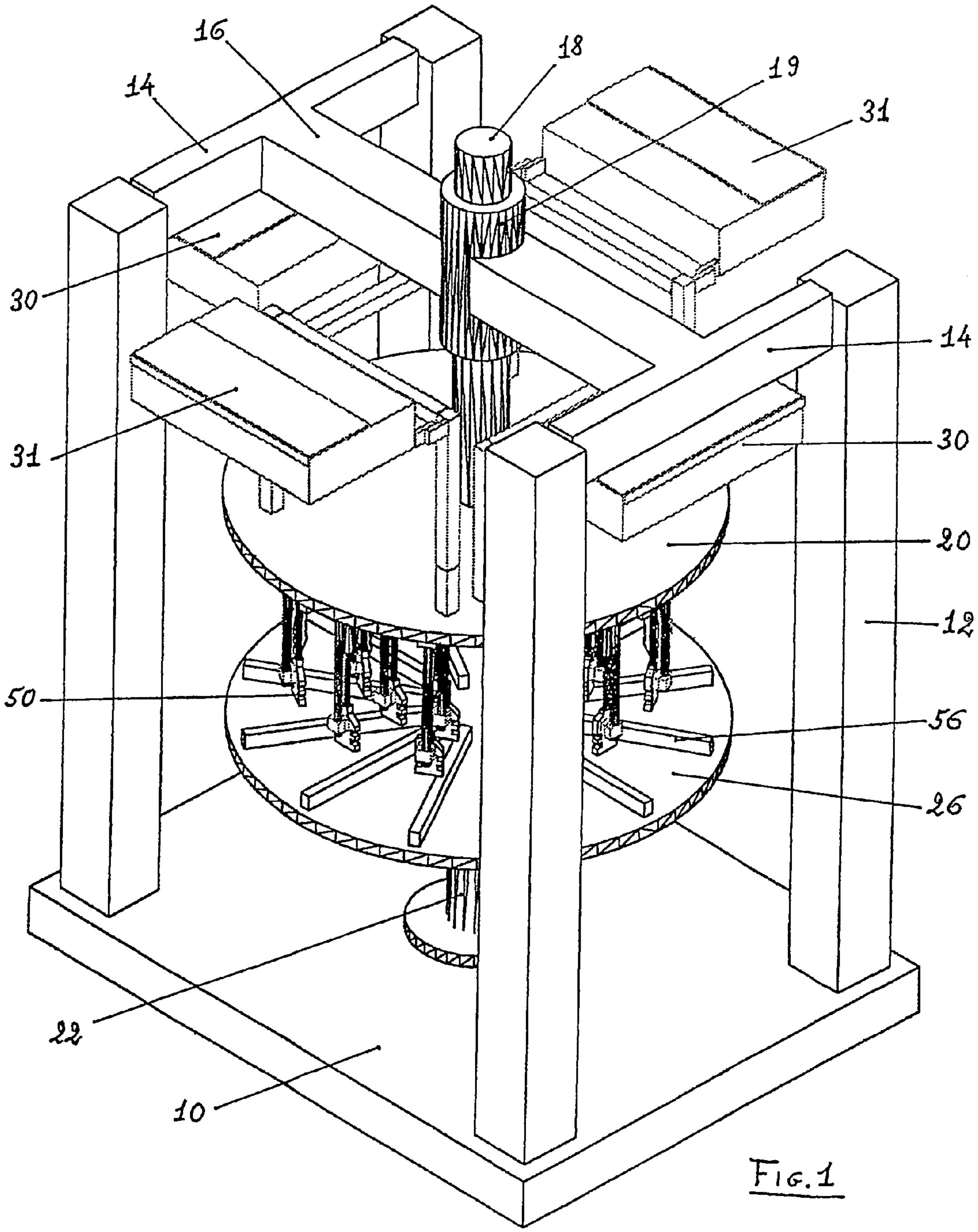
FIG. 1 is a comprehensive isometric view of the riveter equipped with the system according to the present invention.

Making now reference to the annexed drawings' figures, the riveter comprises a bed 10 whereon a frame made of four tubular uprights 12 joint by two shoulders 14 and a central cross member 16 is fixed.

The central cross member 16 supports an upper bearing shaft 18 equipped with an hydraulic motor 19 for the rotation of the upper revolving table 20 carrying the riveting mechanisms which will be described later in details, while the bed 10 is fixed to the lower revolving shaft 22 put in motion by the relative hydraulic motor 24 and that supports the lower revolving table 26 carrying the upsetting mechanisms. Inside the lower revolving shaft a central upright, not shown, is coaxially arranged whereon the item to be riveted, in this case a flange F of cables reel, gets placed still. Four nails' magazines assembled in the crossed position are placed in the upper part of the riveter, and more precisely two opposite magazines 30 fixed to the shoulders 14 and another two opposite magazines 31 fixed on the higher part of the upper revolving table 20 which is equipped with holes 33 for the passage of the hoses 48 of nails feeding to the riveting mechanisms through the selecting device described hereinafter.

The nails' magazines 30 and 31 are equipped with a set of adjustable slanting nail guides (not shown) wherein a string of nails C slides and enters into a slanting guide 34 of a nail selecting device each time that the magazine gets tilted forward by an appropriate hydraulic cylinder 36. The first nail at the end of the guide 34 stops against a laminar disc 38 of the selecting device, which when receiving a command is made to rotate by its pneumatic cylinder 40 placing its hollow cutout 42 in the nail receiving position. Therefore, the additional rotation of the laminar disc 38 blocks the further nails from coming out of the guide 34 and makes the nail to fall into the funnel-shaped cavity 44 of the lower nail conveyor fixed cylinder 46, from which the nail is sent by gravity through a connection hose 48 to the nail collet 50 being part of the riveting mechanism that comprises also a riveting hydraulic cylinder 52 and it is fixed through a bracket 54 to the upper revolving table 20.

Beneath the flange F made of wooden boards A whereon the nails C must be applied along the outlines formed by concentric circles, the lower revolving table 26 is placed and is equipped with upsetting members 56 which bend inside the point of the nails C pressed in by the hammers or stems of the riveting hydraulic cylinders 52. This pressurized riveting system is noticeably less noisy than the prior art systems and thus it has a low acoustic environmental impact.

Figure 2:
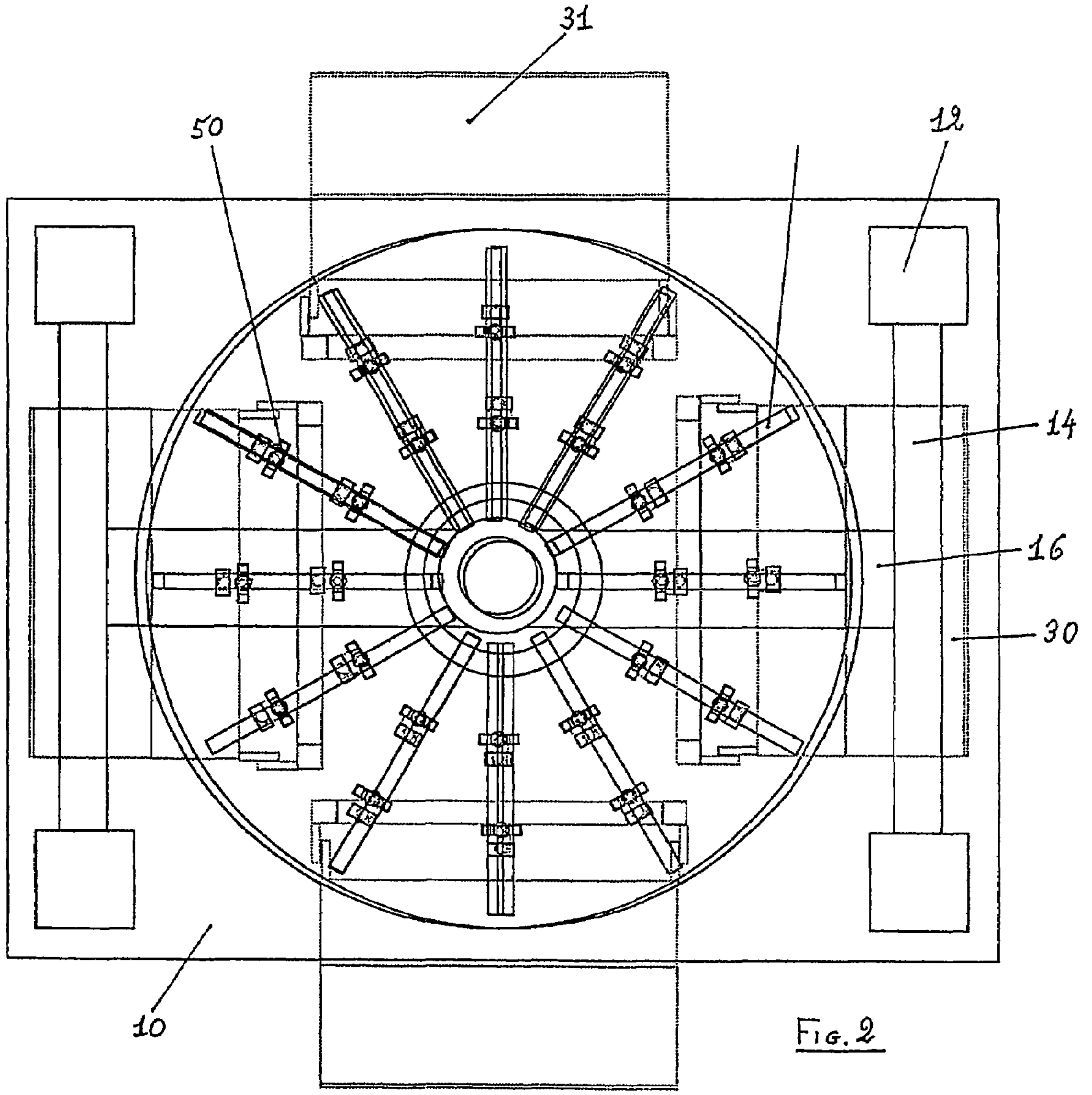
FIG. 2 is a simplified schematic plan view of the riveter showing the mechanisms' star arrangement.
Figure 3:
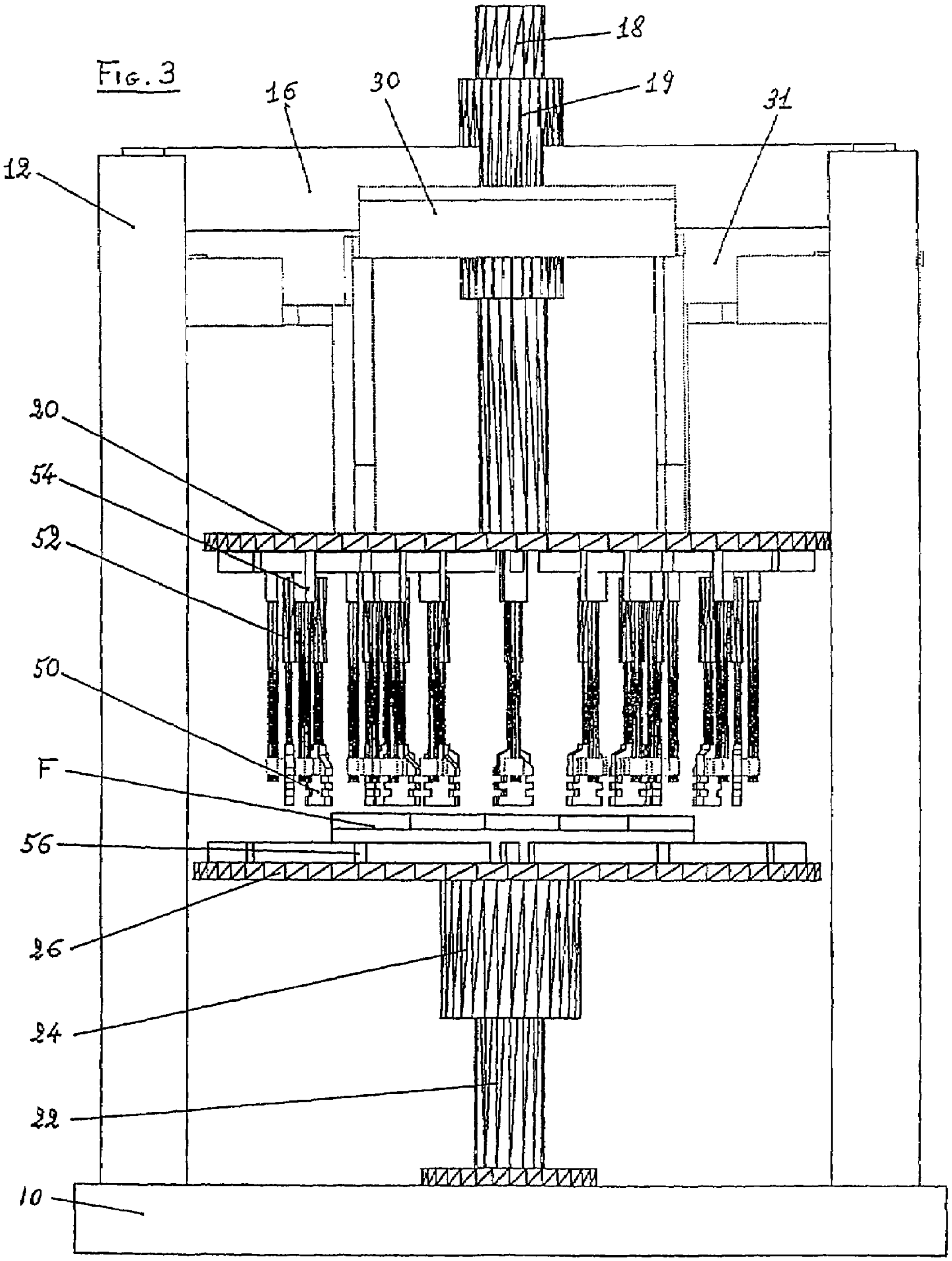
FIG. 3 is a front elevational view of the riveter.
Figure 4:
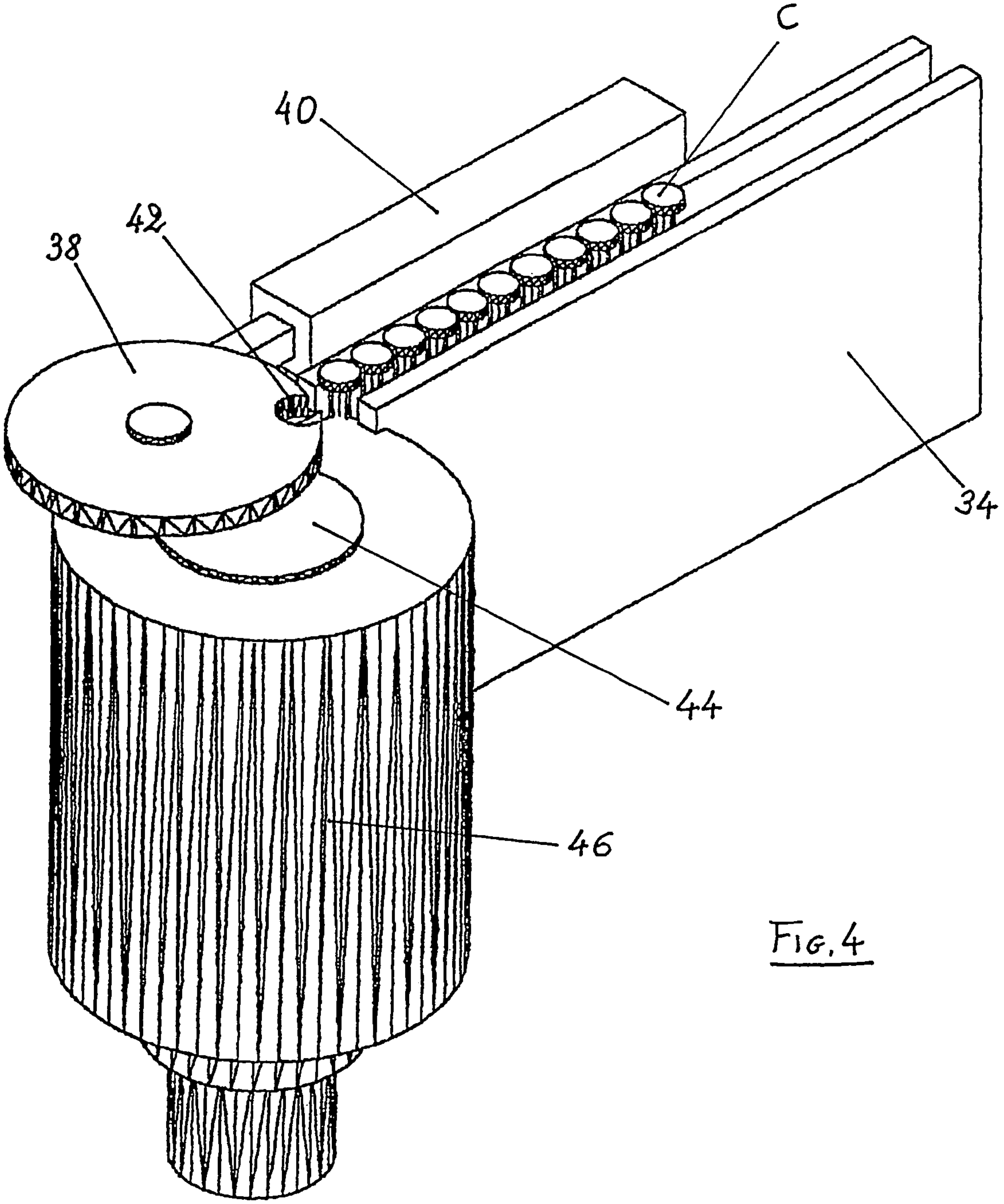
FIG. 4 is a perspective view of the nail's selecting device.
Figure 5:
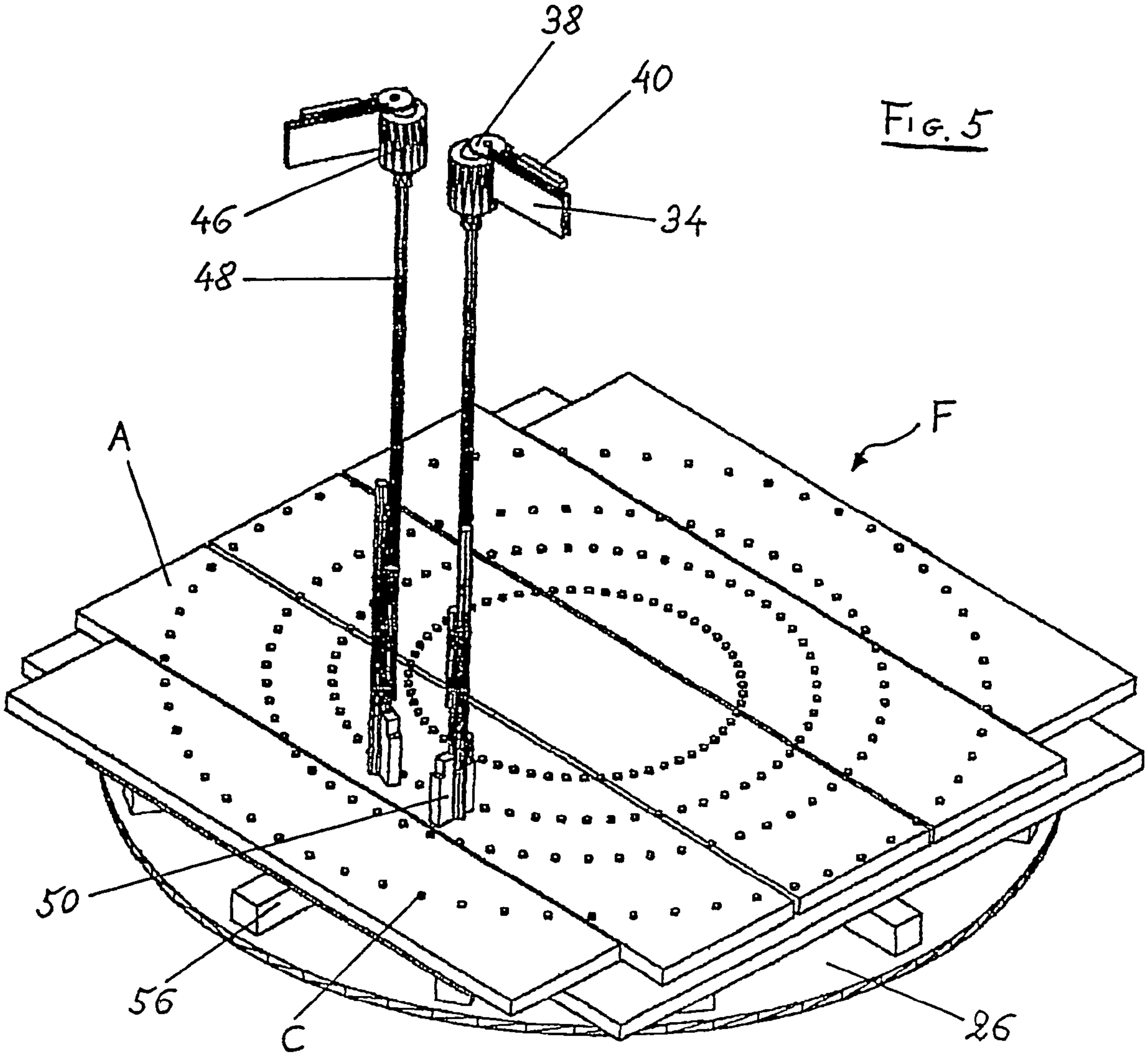
FIG. 5 is a perspective view showing the reel's flange placed above the lower table with two mechanisms working on it in order to show its operation.
Figure 6:
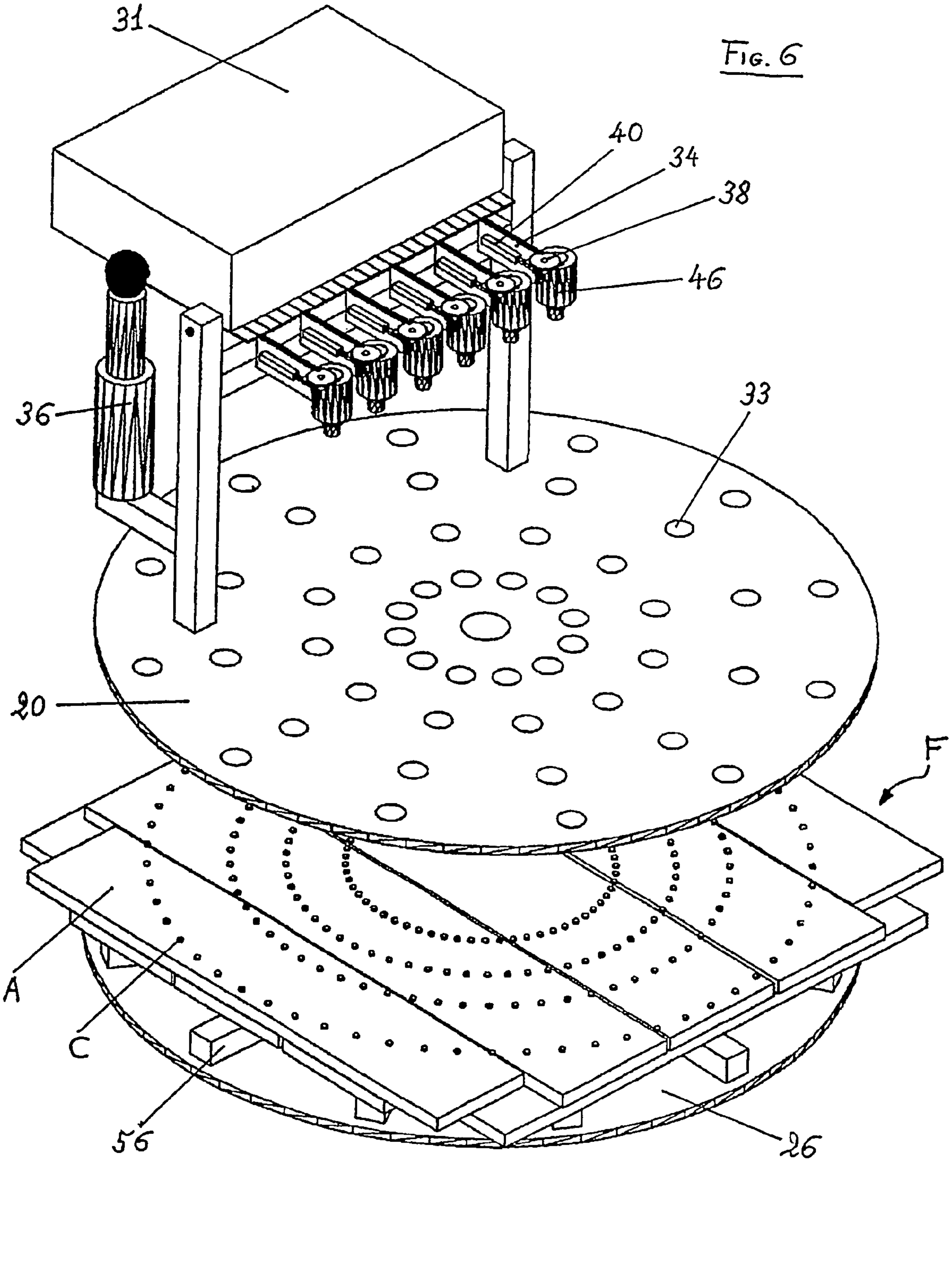
FIG. 6 is a perspective view showing the revolving lower table, the flange to be riveted, an upper fixed plate and a nails' magazine with the relative nail selectors.
Figure 7:
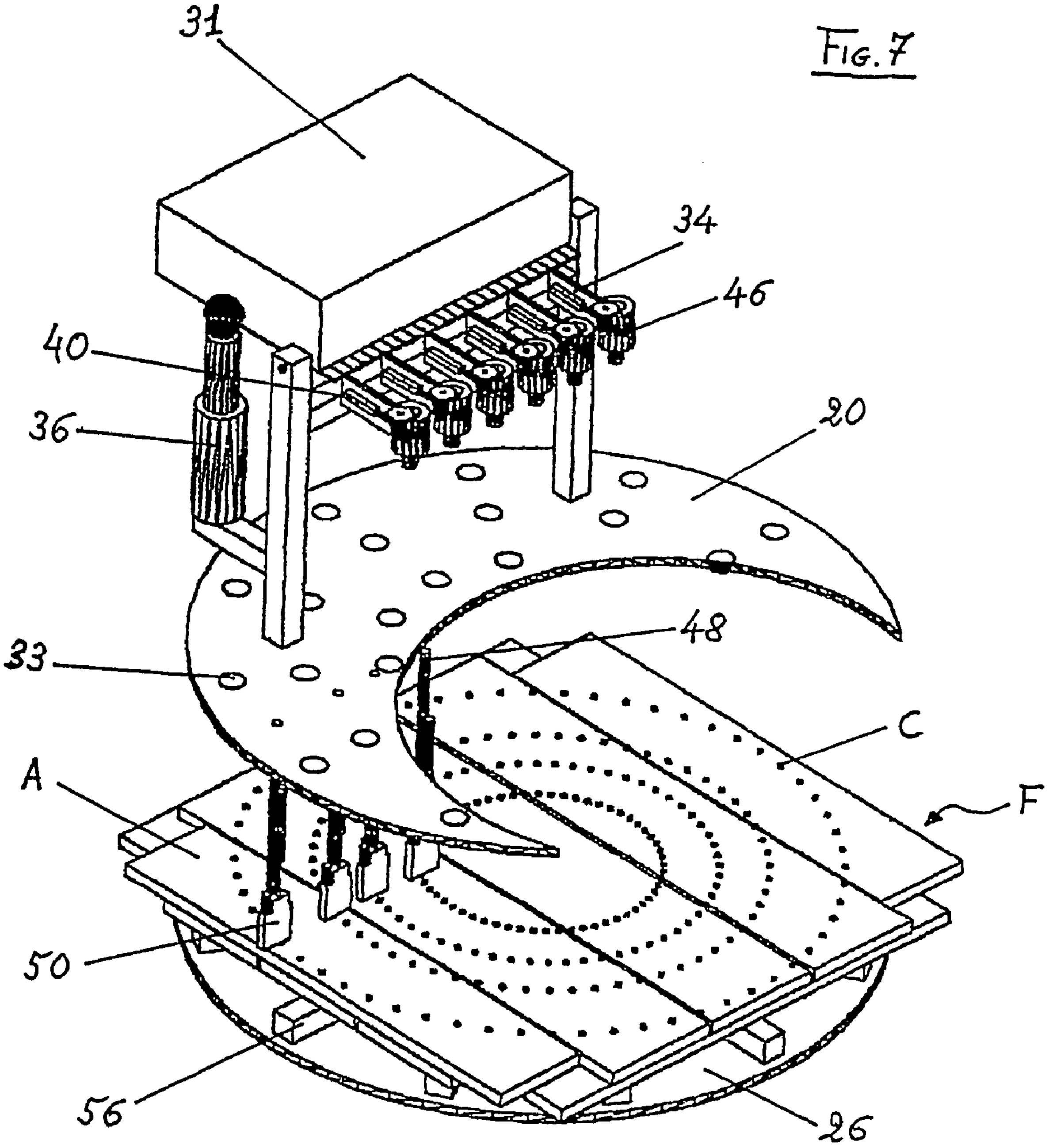
FIG. 7 is a view similar to FIG. 6, but with the upper plate partially removed and showing also a riveting mechanisms unit acting on the corresponding riveting radius.

In the illustrative embodiment shown in the annexed drawings, the riveter comprises twelve radiuses, consequently the riveting plane of the flange must rotate only for a twelfth of a round and that is for 30 degrees. Each radius can include two, three, four or even more riveting and upsetting mechanisms. In FIGS. 1, 2 and 3 only two mechanisms for each radius are shown, which are those needed for applying two rounds of nails, while in FIGS. 5, 6 and 7 four riveting concentric circles are shown so that there are four mechanisms for each radius. The radial position of the mechanisms on each radius can be fixed or also adjustable along the radius.

Obviously the various movements are automated and controlled by proper limit stops, sensors, electric and electronic circuits programmable according to the number of mechanisms, the number of nails and riveting rounds for each circle, the dimensions of the surface to be riveted and so on.

Taking the previously described embodiment also shown in the annexed drawings as an example, always in an illustrative way, as a function of the diameter of the flange to be riveted, of the diameter of the nails' rounds on the same flange and of the distance between nail and nail in the circular direction on the same diameter of each round of nails, the operative speed for covering the circumference by 30 degrees can be changed.

If there were measurement correspondence between the distance from nail to nail of a same circumference and the circumference's length covered in 30° the simultaneous riveting of the 48 nails would occur. If additional 48 nails were to be needed, another electronic signal for withdrawing again all the hammers together would be enough. From outside towards the inside it is possible to skip the nail during the various riveting rounds. This becomes necessary when the nail's pitch will get shorter relative to the outer one between the most peripheral riveting round and there on all the more internal others.

A maximum of four hammers for each star riveter is provided on this machine. Nevertheless, if nailing with a single blow is the desired operation then it is possible to increase the number of upsetting members and hammers. As a matter of fact, by arranging in the appropriate manner the templates with the different riveting and upsetting mechanisms it is possible to nail each suitable surface with a single blow and at the same time with as many nails as desired.

Although in the described and illustrated preferred embodiment, the riveting and upsetting mechanisms rotate while the item to be riveted is still, it could also be possible to make the item to be riveted rotate and to keep the mechanisms still, this operation nonetheless remains within the invention's scope of protection whose essential principle is that of star arrangement of said riveting and upsetting mechanisms.

At last, it must be emphasized that several modifications, additions, variations and/or substitutions of elements could be made to the invented system, as for example the hydraulic or pneumatic commands could be replaced by other similar devices, without departing from its spirit and without as well falling out of the scope of protection, as also indicated in the appended claims.

The invention claimed is:

1. A simultaneous riveting system of flat surfaces for riveters, comprising riveting and upsetting mechanisms, characterized in that said mechanisms are star arrangement units placed along a certain number of radiuses, so that a unit of mechanisms of each radius must hammer in only nails which are applied into a circular sector of a surface to be riveted, delimited by two successive radiuses, wherein the riveting mechanisms are fixed to an upper revolving table of the system, and as many upsetting mechanisms are respectively fixed to a lower revolving table of the system, the surface to be riveted being placed between the two revolving tables.

2. The system according to claim 1, characterized in that the surface to be riveted can be nailed with a single blow when the number of mechanisms matches the number of nails the be applied.

3. The system according to claim 1, characterized in that the riveting and upsetting mechanisms and the nail magazine are driven by hydraulic cylinders, and the nail selector is driven by a pneumatic cylinder.

4. The system according to claim 1 wherein the radial position of the riveting mechanisms on said upper table is fixed.

5. The system according to claim 1 wherein the radial position of the riveting mechanisms on said upper table is adjustable.

6. The riveter of claim 1 wherein at least two riveting mechanisms are positioned on at least one of said upper table radii.

7. The riveter of claim 1 wherein a single riveting mechanism is positioned on one of said upper table radii.

8. A simultaneous riveting system of flat surfaces for riveters, comprising riveting and upsetting mechanisms, characterized in that said mechanisms are star arrangement units placed along a certain number of radiuses, so that a unit of mechanisms of each radius must hammer in only nails which are applied into a circular sector of a surface to be riveted, delimited by two successive radiuses, wherein each riveting mechanism comprises a nail collet which receives a nail from a selecting device and a cylinder's hammer or stem that presses the nail into the surface to be riveted, and the nail selecting device is made of a nail conveyor which sends the nail to the nail collet through a hose, by receiving it from a slanting guide that picks up the nails from a nails' magazine and passes them one by one to a reciprocating laminar disc which pushes them inside the conveyor.

9. The system according to claim 8, characterized in that the magazine is equipped with a fan-like movement, which supplies the conveyor's slanting guide with nails when it is tilted forward.

10. The system according to claim 9, characterized in that the riveting and upsetting mechanisms and the nail magazine are driven by hydraulic cylinders, and the nail selector is driven by a pneumatic cylinder.

11. The system according to claim 8, characterized in that the surface to be riveted can be nailed with a single blow when the number of mechanism matches the number of nails the be applied.

12. The system according to claim 8, characterized in that the riveting and upsetting mechanisms and the nail magazine are driven by hydraulic cylinders, and the nail selector is driven by a pneumatic cylinder.

13. A riveter which comprises:

a frame;

an upper table rotatably mounted in said frame;

a lower table mounted in said frame;

a plurality of riveting mechanisms positioned along a plurality of radii on said upper table;

an upset member positioned on said lower table; and a work piece support for supporting a work piece to be riveted between said upper and lower tables.

14. The riveter of claim 13 further comprising a plurality of upset members positioned along a plurality of radii on said lower table.

15. The riveter of claim 14 further comprising a second hydraulic motor drivingly connected to said lower table for rotating said lower table and said upset members to a desired location with respect to said riveting mechanisms.

16. The riveter of claim 13 where each of said riveting mechanisms comprises a nail collet and a rivet cylinder.

17. The riveter of claim 13 further comprising a nail magazine for feeding nails to said riveting mechanisms mounted on said frame above said upper table.

18. The riveter of claim 17 further comprising a plurality of radial bores formed in said upper table, nail conduits extending from said nail magazine through said radial bores to said rivet mechanisms.

19. The riveter of claim 13 further comprising actuating means for simultaneously actuating said plurality of riveting mechanisms.

20. The riveter of claim 13 further comprising a first hydraulic motor drivingly connected to said upper table for rotating said upper table and said riveting mechanisms to a desired location with respect to said work piece.

21. The riveter of claim 13 wherein the radial position of the riveting mechanisms on said upper table is fixed.

22. The riveter of claim 13 wherein the radial position of the riveting mechanisms on said upper table is adjustable.

23. The riveter of claim 13 wherein at least two riveting mechanisms are positioned on at least one of said upper table radii.

24. The riveter of claim 13 wherein a single riveting mechanism is positioned on one of said upper table radii.

* * * * *